(12) United States Patent
Robert et al.

(10) Patent No.: US 9,437,010 B2
(45) Date of Patent: Sep. 6, 2016

(54) METHOD AND DEVICE FOR GENERATING A MOTION FIELD FOR A VIDEO SEQUENCE

(71) Applicant: THOMSON LICENSING, Issy de Moulineaux (FR)

(72) Inventors: Philippe Robert, Rennes (FR); Tomas Enrique Crivelli, Rennes (FR); Pierre-Henri Conze, Rennes (FR)

(73) Assignee: Thomson Licensing (FR)

( * ) Notice: Subject to any disclaimer, the term of this patent is extended or adjusted under 35 U.S.C. 154(b) by 0 days.

(21) Appl. No.: 14/372,548

(22) PCT Filed: Jan. 17, 2013

(86) PCT No.: PCT/EP2013/050870
§ 371 (c)(1),
(2) Date: Jul. 16, 2014

(87) PCT Pub. No.: WO2013/107833
PCT Pub. Date: Jul. 25, 2013

(65) Prior Publication Data
US 2014/0363053 A1    Dec. 11, 2014

(30) Foreign Application Priority Data

Jan. 19, 2012    (EP) .................................... 12305069

(51) Int. Cl.
*G06K 9/00*    (2006.01)
*G06T 7/20*    (2006.01)
(Continued)

(52) U.S. Cl.
CPC .............. *G06T 7/20* (2013.01); *H04N 19/577* (2014.11); *G06T 2207/10016* (2013.01); *G06T 2207/20016* (2013.01); *H04N 19/52* (2014.11); *H04N 19/56* (2014.11)

(58) Field of Classification Search
None
See application file for complete search history.

(56) References Cited

U.S. PATENT DOCUMENTS 5,774,183 A * 6/1998 Riek et al. ............... 375/240.16
6,008,865 A * 12/1999 Fogel ........................... 348/700
(Continued)

FOREIGN PATENT DOCUMENTS

GB         2282021       3/1995

OTHER PUBLICATIONS

Hadizadeh H et al. "Rate distortion optimized pixel based motionvector concatenation for reference picture selection", IEEE transactions on circuits and systems forr video technology, IEEE service center, US, vol. 21, Aug. 1, 2011, pp. 1139-1151.
(Continued)

*Primary Examiner* — Shefali Goradia
(74) *Attorney, Agent, or Firm* — Tutunjian & Bitetto, P.C.

(57)    ABSTRACT

A method for generating a motion field between a current frame and a reference frame belonging to a video sequence from an input set of elementary motion fields is disclosed. The method comprises performed for each pixel belonging to said current frame: determining a plurality of candidate motion vectors between the current frame and the reference frame wherein each candidate motion vector is the result of the sum of a first motion vector between the current frame and an intermediary frame belonging to the video sequence and of a second motion vector between the intermediary frame and the reference frame; and selecting a motion vector among candidate motion vectors. The method is remarkable in that elementary motion fields are obtained with different time intervals between pairs of frames and in that the first motion vector belongs to the input set of elementary motion fields and the second motion vector belongs to a set of previously selected motion vectors for other current frames of the video sequence.

20 Claims, 3 Drawing Sheets

(51) Int. Cl.
*H04N 19/577* (2014.01)
*H04N 19/56* (2014.01)
*H04N 19/52* (2014.01)

(56) References Cited

U.S. PATENT DOCUMENTS

| | | | |
|---|---|---|---|
| 6,483,928 | B1 | 11/2002 | Bagni et al. |
| 7,751,479 | B2 * | 7/2010 | Paniconi et al. ......... 375/240.12 |
| 8,098,733 | B2 * | 1/2012 | Veremeev et al. ....... 375/240.16 |

OTHER PUBLICATIONS

Brox et al: "Object Segmentation by Long Term Analysis of Point Trajectories", Univ. of California at Berkeley, Part V, 2010, pp. 282-295.
Fradet et al: "Clustering Point Trajectories with Various Life-Spans", 2009 IEEE, pp. 1-8.
Sand et al: "Practice Video: Long Range Motion Estimation using Point Trajectories", vol. 8, No. 1, 2008, pp. 72-91.
Sundaram etal: "Dense Point Trajectories by GPU-accelerated Large Displacement Optical Flow", Univ. of California at Berkeley, Proc. ECCV, 2010, pp. 1-14.
Search Report Dated May 13, 2013.
Jia et al., "Optical flow estimation using learned sparse model", 2011 IEEE International Conference on Computer Vision, Barcelona, Spain, Nov. 6, 2011, pp. 1-8.
Wang et al.,"Action recognition by dense trajectories" 2011 IEEE Conference on Computer Vision and Pattern Recognition (CVPR) 2011, Colorado Springs, Colorado, USA, Jun. 20, 2011, pp. 3169-3176.
Brox et al., "Large Displacement Optical Flow: Descriptor Matching in Variational Motion Estimation", IEEE Transactions on Pattern Analysis and Machine Intelligence, vol. 33, No. 3, Mar. 2011, pp. 500-513.
Rabe et al., "Dense, Robust, and Accurate Motion Field Estimation from Stereo Image Sequences in Real-Time" 11th European Conference on Computer Vision (ECCV) 2010, Heraklion, Crete, Greece, Sep. 5, 2010, pp. 582-595.
Brox et al., "Large displacement optical flow", 2009 IEEE International Conference on Computer Vision and Pattern Recognition Workshops (CVPR) 2009, Miami, Florida, USA, Jun. 20, 2009, pp. 1-8.
Buchanan et al., "Combining local and global motion models for feature point tracking", 2007 IEEE International Conference on Computer Vision and Pattern Recognition Workshops (CVPR) 2007, Minneapolis, Minnesota, USA, Jun. 18, 2007, pp. 1-8.
Boykov et al., "Fast approximate energy minimization via graph cuts", IEEE Transactions on Pattern Analysis and Machine Intelligence, vol. 23, No. 11, Nov. 2001, pp. 1222-1239.
Lempitsky et al., "Fusion flow: discrete-continuous optimization for optical flow estimation", 2008 IEEE International Conference on Computer Vision and Pattern Recognition Workshops (CVPR) 2008, Anchorage, Alaska, USA, Jun. 23, 2008, pp. 1-8.
Robert et al., "Disparity-compensated view synthesis for s3D content correction", Stereoscopic Displays & applications, San Francisco, California, USA, Jan. 2012, pp. 1-15.

* cited by examiner

METHOD AND DEVICE FOR GENERATING A MOTION FIELD FOR A VIDEO SEQUENCE

This application claims the benefit, under 35 U.S.C. §365 of International Application PCT/EP2013/050870, filed Jan. 17, 2013, which was published in accordance with PCT Article 21(2) on Jul. 25, 2013 in English and which claims the benefit of European patent application No. 12305069.2 filed Jan. 19, 2012.

TECHNICAL FIELD

The present invention relates generally to the field of dense point matching in a video sequence. More precisely, the invention relates to a method for generating a motion field between a current frame and a reference frame belonging to a video sequence from an input set of elementary motion fields.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

The problem of point and patch tracking is a widely studied and still open issue with implications in a broad area of computer vision and image processing. On one side and among others, applications such as object tracking, structure from motion, motion clustering and segmentation, and scene classification may benefit from a set of point trajectories by analyzing an associated feature space. In this case, usually a sparse or semi-sparse set of meaningful points needs to be tracked such as described by Sand and Teller in "Particle Video: Long-Range Motion Estimation Using Point Trajectories" (IJCV, vol. 80, no. 1, pp. 72-91, 2008). Indeed, those points that carry important information about the structure of the scene are more easily tracked. Recent approaches as those presented by Brox and Malik in "Object segmentation by long term analysis of point trajectories" (Proc. ECCV, 2010) or by Fradet, Robert, and Pérez in "Clustering point trajectories with various life-spans" (Proc. IEEE CVMP, 2011) are examples of the importance of long-term motion cues for spatio-temporal video segmentation.

On the other side, applications related to video processing such as augmented reality, texture insertion, scene interpolation, view synthesis, video inpainting and 2D-to-3D conversion eventually require determining a dense set of trajectories or point correspondences that permit to propagate large amounts of information (color, disparity, depth, position, etc.) across the sequence. Dense instantaneous motion information is well represented by optical flow fields and points can be simply propagated through time by accumulation of the motion vectors. That is why state-of-the-art methods as described by Brox and Malik in "Object segmentation by long term analysis of point trajectories" (Proc. ECCV, 2010) or by Sundaram, Brox and Keutzer in "Dense point trajectories by GPU-accelerated large displacement optical flow" (Proc. ECCV, 2010) have built on top of optical flow, methods for dense point tracking using such accumulation of motion vectors.

There are drawbacks to the methods for dense point tracking as mentioned above. In case of direct long-term estimation, the colour or the aspect of an object may change between 2 distant frames, thus leading to an imprecise motion field between the 2 frames. In the case of dense point tracking relying on accumulation, a drift in the displacement of the pixel may challenge the accuracy of the method.

The technical problem to solve is to provide an improved dense displacement map, also called motion field, between two frames of the video sequence.

The present invention provides such a solution.

SUMMARY OF INVENTION

The invention is directed to a method for generating a motion field between a current frame and a reference frame belonging to a video sequence from an input set of elementary motion fields. An elementary motion field is associated to an ordered pair of frames comprises for each pixel belonging to a first frame of the ordered pair of frames, a motion vector computed from a location of said pixel in the first frame to a location in a second frame of the ordered pair of frames. The method comprises the following steps performed for each pixel belonging to said current frame: determining a plurality of candidate motion vectors between the current frame and the reference frame wherein each candidate motion vector is the result of the sum of a first motion vector between the current frame and an intermediary frame belonging to the video sequence and of a second motion vector between the intermediary frame and the reference frame; and selecting a motion vector among candidate motion vectors. The method is remarkable in that the first motion vector belongs to the input set of elementary motion fields and the second motion vector belongs to a set of previously selected motion vectors for other current frames of the video sequence. Advantageously, the method allows to generate a motion field by concatenation of a previously computed long term motion field and of an elementary motion field thus limiting the drift of the estimation while relying on intermediary frame information. The method for generating a motion field thus defines a multi-step concatenation of motion fields. Advantageously, candidates motion vectors are computed from a plurality of intermediary frames corresponding to a given displacement or path of the pixel associated to the motion vectors.

According to an advantageous characteristic, the method is sequentially iterated for successive current frames belonging to the video sequence starting from the frame adjacent to the reference frame. According to a first embodiment described hereafter, the adjacent frame is the left adjacent frame while according to a second embodiment described hereafter, the adjacent frame is the right adjacent frame. Advantageously, this characteristic allows to sequentially generate a set of motion fields for a plurality frame of a video sequence since the successive frame defines an order in the sequence but may not comprise each frames of the video sequence.

According to a further advantageous characteristic, the method is sequentially iterated for each successive current frames belonging to the video sequence starting from the frame adjacent to the reference frame thus generating a set of motion fields between frames of a video sequence and a reference frame from an input set of elementary motion fields. Advantageously, this characteristic allows to sequentially generate a set of motion fields for each frame of a video sequence.

According to a further advantageous characteristic, the method is sequentially iterated for successive current frames belonging to the video sequence in the reverse order back to the reference frame. Advantageously, this characteristic allows to refine the generation of motion fields by applying a second pass on all frames of the video sequence.

According to a further advantageous characteristic, intermediary frames are temporally placed either before or after the current frame. Advantageously, this characteristic allows to take into account past and future intermediary frame information.

In a first embodiment, a motion field is generated from a current frame to a reference frame belonging to a video sequence from an input set of elementary motion field. In the first embodiment:

- the plurality of candidate motion vectors $(d_{n,N}(x_n))$ is determined from the current frame $(I_n)$ to the reference frame $(I_N)$,
- each candidate motion vector $(d_{n,N}(x_n))$ is the result of the sum of a first motion vector $(d_{n,n+sk}(x_n))$ from the current frame $(I_n)$ to an intermediary frame $(I_{n+sk})$ belonging to the video sequence and of a second motion vector $(d_{n+sk,N}(x_n+d_{n,n+sk}(x_n)))$ from the intermediary frame $(I_{n+sk})$ to the reference frame $(I_N)$;
- the first motion vector $(d_{n,n+sk}(x_n))$ belongs to the input set of elementary motion fields and the second motion vector $(d_{n+sk,N}(x_n+d_{n,n+sk}(x_n)))$ belongs to a set of previously selected motion vectors for other current frames of the video sequence. The method thus generates a motion field called "to the reference".

In a second embodiment, a motion field is generated from a reference frame $(I_N)$ to a current frame $(I_n)$ belonging to a video sequence from a input set of elementary motion fields. In the second embodiment:

- the plurality of candidate motion vectors $(d_{N,n}(x_N))$ is determined from the reference frame $(I_N)$ to said current frame $(I_n)$
- each candidate motion vector $(d_{N,n}(x_N))$ is the result of the sum of a second motion vector $(d_{N,n-sk}(x_N))$ from said reference frame $(I_N)$ to an intermediary frame $(I_{n-sk})$ and of a first motion vector $(d_{n-sk,n}(x_N+d_{N,n-sk}(x_N)))$ from said intermediary frame $(I_{n-sk})$ to said current frame $(I_n)$
- said second motion vector $(d_{N,n-sk}(x_N))$ belongs to a set of previously selected motion vectors and said first motion vector $(d_{n-sk,n}(x_N+d_{N,n-sk}(x_N)))$ belongs to the input set of elementary motion fields.

Advantageously the method allows generating a motion field by a direct concatenation of the previously computed long term motion field and of an elementary motion field, thus generating a motion field from the reference by opposition of a motion field to the reference as previously described. Such motion fields are advantageous for applications including object tracking where one needs to track points originated in the reference image.

In a first variant, in the step of determining a plurality candidate motion vectors, the sum is a sum of at least two motion vectors through at least one intermediary frame, and wherein a last motion vector belongs to a set of previously selected motion vectors for other current frames of the video sequence and others motion vectors belongs to the input set of elementary motion fields. Thus the concatenation of the previously computed long term motion field and of at least two elementary motion fields is used to generate the set of motion fields.

In a second variant, the input set of elementary motion fields comprises elementary motion fields computed by different estimators; each estimator applying a determined method for generating an elementary motion field associated to an ordered pair of frames. In others words, the concatenation of the previously computed long term motion field and of elementary motion fields computed by different estimator is used to generate the set of motion fields. In this variant, the set of candidate motion vectors is not only function of the plurality of intermediary frames used in the concatenation, but also to the plurality of elementary motion vectors between the current frame and an intermediary frame.

Any characteristic or variant described for the method is compatible with a device intended to process the disclosed methods.

BRIEF DESCRIPTION OF DRAWINGS

Preferred features of the present invention will now be described, by way of non-limiting example, with reference to the accompanying drawings, in which.

DESCRIPTION OF EMBODIMENTS

Figure 1A:
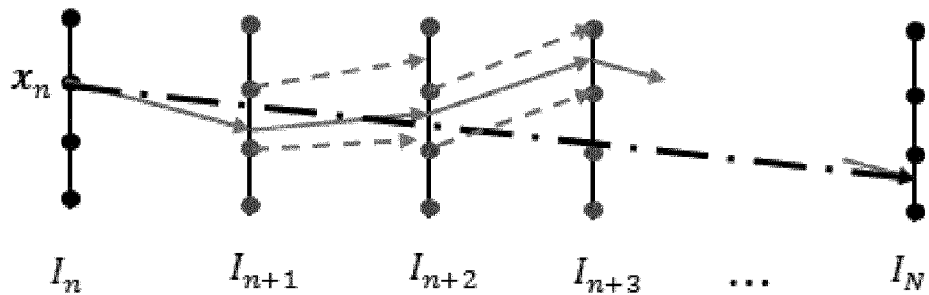
FIG. 1a illustrates displacement vectors integration by method for building a motion field according to prior art.

In the following description, the term "motion vector" $d_{N,M}(x_N)$ comprises a data set which defines a trajectory from a pixel $x_N$ into a first frame $I_N$ to a corresponding location into a second frame $I_M$ of a video sequence and wherein indices N and M are numbers representative of the temporal frame position in the video sequence. An elementary motion vector $d_{N,N+1}(x)$ defines a motion vector between 2 consecutives frames $I_N$ and $I_{N+1}$. An elementary motion field comprises a set a motion vectors for each pixel from a reference frame $I_N$ to a determined frame $I_n$ of a video sequence computed from the reference frame $I_N$ to the determined frame $I_n$. The reference frame $I_N$ and the determined frame $I_n$ are consecutive frames or distant frames. An input set of elementary motion fields comprises a plurality of elementary motion field respectively associated to a plurality of pairs of frames of the video sequence, wherein each elementary motion field is computed independently from the others. More generally, a motion field is defined between a determined frame $I_n$ and a reference frame $I_N$ thus comprising embodiment wherein a motion field is defined from a reference frame $I_N$ to a determined frame $I_n$ and embodiment wherein a motion field is defined from a determined frame $I_n$ to a reference frame $I_N$.

The term "motion vector" or "displacement vector", "elementary motion vector" or "elementary displacement vector", "elementary motion field" or "elementary displacement field", "elementary motion field" or "elementary displacement field" are indifferently used in the following description.

As state-of the art method for dense point tracking, the method according to the invention exploits a set of input motion fields computed independently, which we call elementary motion fields. This set, however, is composed by motion fields obtained with different estimation steps, i.e., time intervals between pairs of images. We have observed that for long term dense point matching, some regions of the image are better matched by concatenation of instantaneous motion vectors, while for others a direct long term matching is preferred.

A salient idea of the method for generating a set of motion fields for a video sequence is to propose an advantageous sequential method of combining elementary motion fields to produce a long term matching.

Consider an image sequence $\{I_n\}_{n:0 \ldots N}$ and let the last image $I_N$ be the reference image. Our objective is to compute the displacement vector at each location of each image with respect to the reference, i.e. $d_{n,N}(x_n)$, for each n, where $x_n$ belongs to the image grid $\Omega$. For the time being, we only assume that the elementary motion fields, $d_{n,n+1}$, $n=0 \ldots N-1$, computed between pairs of consecutive frames are available as input information.

In previous point tracking approaches based on optical flow, a simple 1st-order Euler integration is conducted as follows: 1) take a starting grid point $x_n \in \Omega$ in $I_n$, 2) for $m=n, n+1 \ldots N-1$ obtain iteratively $$x_{m+1} = x_m + d_{m,m+1}(x_m), \quad (1)$$

3) repeat for each $x_n$. This gives an estimate of the positions of the points at time N, by forwards concatenation of elementary motion fields. This simple scheme can then be combined with a more sophisticated global formulation for track estimation.

Figure 1B:
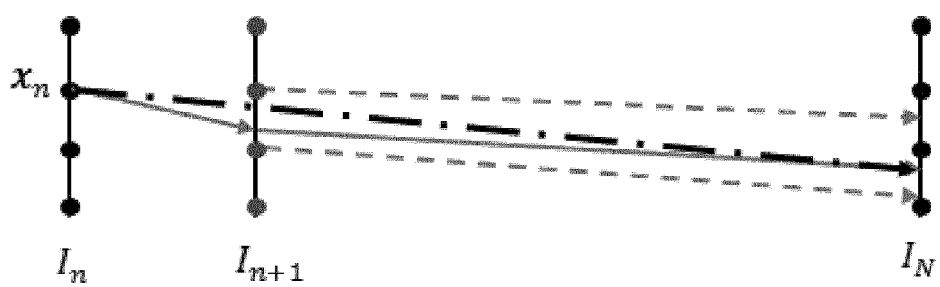
FIG. 1b illustrates motion vectors integration by a method for building a motion field according to an embodiment of the invention.

FIGS. 1a and 1b illustrates the estimation of $d_{n,N}(x_n)$. FIG. 1a illustrates motion vectors integration by method for building a motion field according to prior art accumulation method. Thus in the scheme (corresponding to Eq. 1), elementary motion vectors are interpolated and then accumulated. FIG. 1b illustrates motion vectors integration by a method for building a motion field according to an embodiment of the invention. Thus in the scheme, (corresponding to disclosed method Eq. 2), a previously estimated long term displacement is interpolated and then accumulated with an elementary motion vector. Dashed arrows indicate the displacement vectors at grid locations used for interpolation.

The method according to a first embodiment is based on a different strategy that runs backwards and aims at computing $d_{n,N}(x_n)$ while exploiting the elementary motion fields. It is given by the following iteration:

$$d_{n,N}(x_n) = d_{n,n+1}(x_n) + d_{n+1,N}(x_n + d_{n,n+1}(x_n)), \quad (2)$$

for each grid location $x_n$ in $I_n$. That is, the current long term displacement field $d_{n,N}$ is obtained by concatenation of the previously computed long term field $d_{n+1,N}$ and an elementary motion field $d_{n,n+1}$.

Note the difference between (Eq. 1) and (Eq. 2). Starting from the grid point $x_n$ at image $I_n$, and its elementary displacement $d_{n,n+1}(x_n)$, one computes $x_n + d_{n,n+1}(x_n)$. Then, in the former approach (Eq.1), one interpolates the velocity $d_{n+1,n+2}(x_n + d_{n,n+1}(x_n))$ in $I_n$ (e.g. by bilinear interpolation), and continues accumulating elementary motion vectors in the forward direction as illustrated on FIG. 1a. In the second approach, the interpolation is applied once on the long term motion field $d_{n+1,N}(x_n + d_{n,n+1}(x_n))$ directly between instants n+1 and N. This procedure implies that $d_{n+1,N}$ in (Eq. 2) is available from the previous iteration as illustrated on FIG. 1b. The result is that we sequentially compute the dense displacement maps $d_{n,N}$ backwards, for every frame n with respect to the reference frame N.

In order to obtain the correspondence between all pixels of all images with respect to the reference, it is easy to see that for the standard method the complexity is $O(N^2 P)$ while for the proposed method it is $O(NP)$, where P is the number of pixels for a single image. Besides a higher efficiency, it also appears that this approach is more accurate.

According to a preferred embodiment, the previous strategy is exploited for defining an optimal and sequential way of combining elementary motion fields estimated with different frame steps (i.e. the time interval between two frames) in order to obtain an improved and dense displacement map. The reasoning is based on the following. We want to compute $d_{n,N}(x_n)$. Suppose that for a set of $Q_n$ frame steps at instant n, say $S_n = \{s_1, s_2, s_3, \ldots, s_{Q_n}\} \subset \{1, \ldots, N-n\}$, the set of corresponding motion fields $$\{d_{n,n+s_1}, d_{n,n+s_2}, \ldots, d_{n,n+s_{Q_n}}\}$$

is available. For each $s_k \in S_n$ we write $$d_{n,N}^k(x_n) = d_{n,n+s_k}(x_n) + d_{n+s_k,N}(x_n + d_{n,n+s_k}(x_n)). \quad (3)$$

In this manner we generate different candidate displacements or paths among which we aim at deciding the optimal for each location $x_n$. With $Q_n = 1 \forall n$ and $s_1 = 1$ it reduces to (Eq. 2). This scheme is somewhat related to that presented by Lempitsky, Roth and Rother in "FusionFlow: Discrete-continuous optimization for optical flow estimation" (Proc. IEEE CVPR, 2008) for computing a single optical flow field between two given images, where several candidate solutions are fused on the basis of a global optimization framework.

FIG. 1a illustrates exemplary multi-step point correspondence. For a given point, the displacement from frames n to N can be obtained through different paths according to the input elementary motion fields (solid lines) and the previously estimated long term displacements (dashed lines).

Figure 2A:
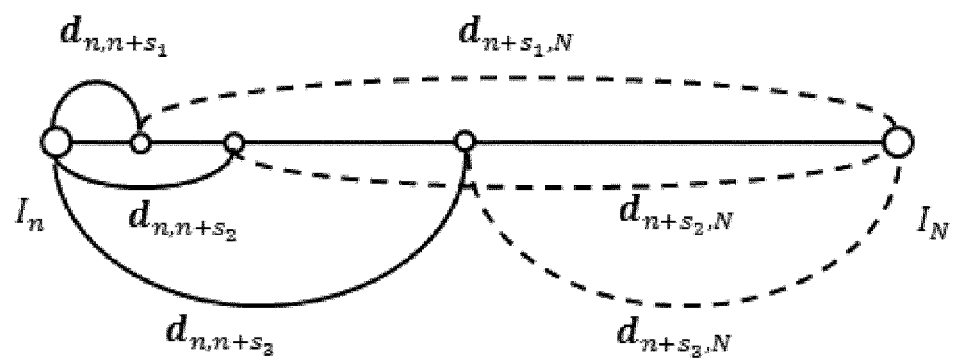
FIG. 2a illustrates multi step point correspondence according to a preferred embodiment of the present invention.
Figure 2B:
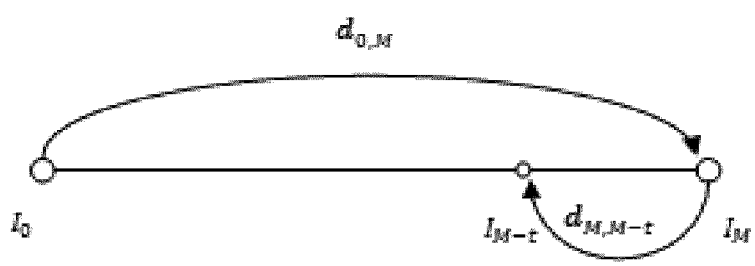
FIG. 2b illustrates multi step point correspondence according to a preferred embodiment of the present invention.

So far the presented approach constructs each candidate path as a concatenation of two motion fields: an elementary motion field and a previously estimated long term displacement. This formulation can be generalized considering candidate paths that are constructed by concatenation of several motion fields in order to compute $d_{n,N}(x_n)$. This formulation corresponds to method according to the first variant. Let us define the sequence of integers $T_k = (n_0^k, n_1^k, n_2^k, \ldots, n_{L_k}^k)$ where each $n_i^k$ is a time instant within the image sequence. It corresponds to a temporal path through $L_k$ frames. In our case $n_1 = n$ and $n_{L_k} = N$. Thus, with this definition we can write the displacement given by a candidate path k as $$d_{n,N}^k(x_n) = \sum_{i=0}^{L_k - 1} d_{n_i, n_{i+1}}(y_i),$$

with $y_i = y_{i-1} + d_{n_{i-1}, n_i}(y_{i-1})$ and $y_0 = x_n$. Note that $T_k$ can be an arbitrary sequence of instants not necessarily monotonically increasing/decreasing, and even it could be the case that for some i, $n_i^k > N$. We give different example cases included in this formulation:

I) $T_k = (0, 1, N)$ corresponds to the case of (Eq. 2) where an elementary field is accumulated with a long term displacement;

II) $T_k=(0, 1, 2, 3, 4, 5, \ldots, N)$ is the standard approach (Eq. 1) for motion accumulation;

III) $T_k=(0, M, M-t)$ with $t>0$ and M a frame within the sequence. This allows to estimate $d_{0,M-t}$ by going in the forward direction beyond M−t and then returning backwards with $d_{M,M-t}$ as illustrated on FIG. 2b which corresponds to an advantageous characteristic.

IV) Any combination of the previous cases.

We have defined and computed the $Q_n$ candidates $d_{n,N}^k(x_n)$ for every point $x_n$ in image $I_n$ and now the best one has to be selected at each location. For that sake, we need to define an optimality criterion and an optimization strategy. We first define the function $C_{n,N}(x_n,d)$ as a matching cost between location $x_n$ in image $I_n$ and location $x_n+d$ in $I_N$. It can be arbitrarily constructed so as to exploit different spatio-temporal image cues for the sake of evaluating the goodness of the match.

Deciding for each location $x_n$ independently by selecting k such that $C_{n,N}(x_n, d_{n,N}^k(x_n))$ is minimized may result in the introduction of an undesired noise in the final motion field, as neighboring image points will be frequently assigned with motion values computed with different values of k. Moreover, the proposed cost may not be robust enough. Thus, we improve the result by embedding it together with a spatial Potts-like regularization process. Let $K=\{k_x\}$ be a labeling of the image grid, where each label indicates one of the available candidate paths. We introduce the energy function:

$$E_{n,N}(K)=\Sigma_x C_{n,N}(x,d_{n,N}^{k_x}(x))-\Sigma_{<x,y>}\alpha\cdot\delta_{k_x=k_y}, \quad (4)$$

where $<x, y>$ is a pair of neighboring image locations according to the 4-point connected neighborhood and $\delta_{k_x=k_y}$ is the Kronecker delta. We obtain the optimal K* by applying a graph-cut-based minimization [6]. This in turn gives the optimal long-term correspondence field $d^*_{n,N}(x)=d_{n,N}^{k'_x}(x)$.

The multi-step algorithm was described on the basis of a set of forward motion fields as inputs. The result is a forward correspondence vector for each point of each image before N. This reasoning is especially useful for video editing tasks, e.g. for the consistent insertion of graphics elements such as logos. Basically, one is able to edit frame N, and then propagate the modified values to the preceding frames using the estimated correspondence fields. Analogously, using backward motion fields as inputs one can readily consider $I_0$ as the reference image instead. Note that in applications where one needs to track points originated in the reference image (as opposed to track points all the way to the reference frame), it is better to apply the iteration in a different manner. In order to track each pixel $x_N$ in $I_N$ in the backward direction we write:

$$d_{N,n}^k(x_N)=d_{N,n+s_k}(x_N)+d_{n+s_k,n}(x_N+d_{N,n+s_k}(x_N)), \quad (5)$$

so that for each starting location we can compute the position at precedent frames. Similarly, using forward motion fields, we can track all the points from image $I_0$ in the forward direction. It is worth to say that combining these different variations of the algorithm, one can track and match (forward and backward) all the pixels of a reference image arbitrarily picked from within the sequence.

We also define $C_{n,N}(x_n,d)$ in (Eq. 4) as the normalized sum of squared differences of pixel color values between image windows of size 5×5. Though this matching criterion may not be invariant to possible scale changes, illumination variations, large deformations and motion discontinuities, we have decided to keep it simple, as it permits to better observe the benefits of the multi-step approach. Meanwhile, the parameter $\alpha$ equals $$\alpha \equiv \alpha_{xy}^n = e^{-\frac{\|c_x^n-c_y^n\|^2}{\sigma^2}}, \quad (6)$$

with $c_x^n, c_y^n$ the 3-channel color vectors at locations x and y, for image n, respectively. The value $\sigma^2=3\cdot(100)^2$ is set manually or can be estimated locally from the color images. This enforces smoothness of the labels assigned to nearby pixels with similar color.

Dense point correspondences over time can be notably enhanced by considering multi-step flow fields. We have described a method to optimally combine several flow estimations also exploiting a new motion accumulation strategy. In fact, any elementary optical flow method can be leveraged with this scheme.

Figure 3:
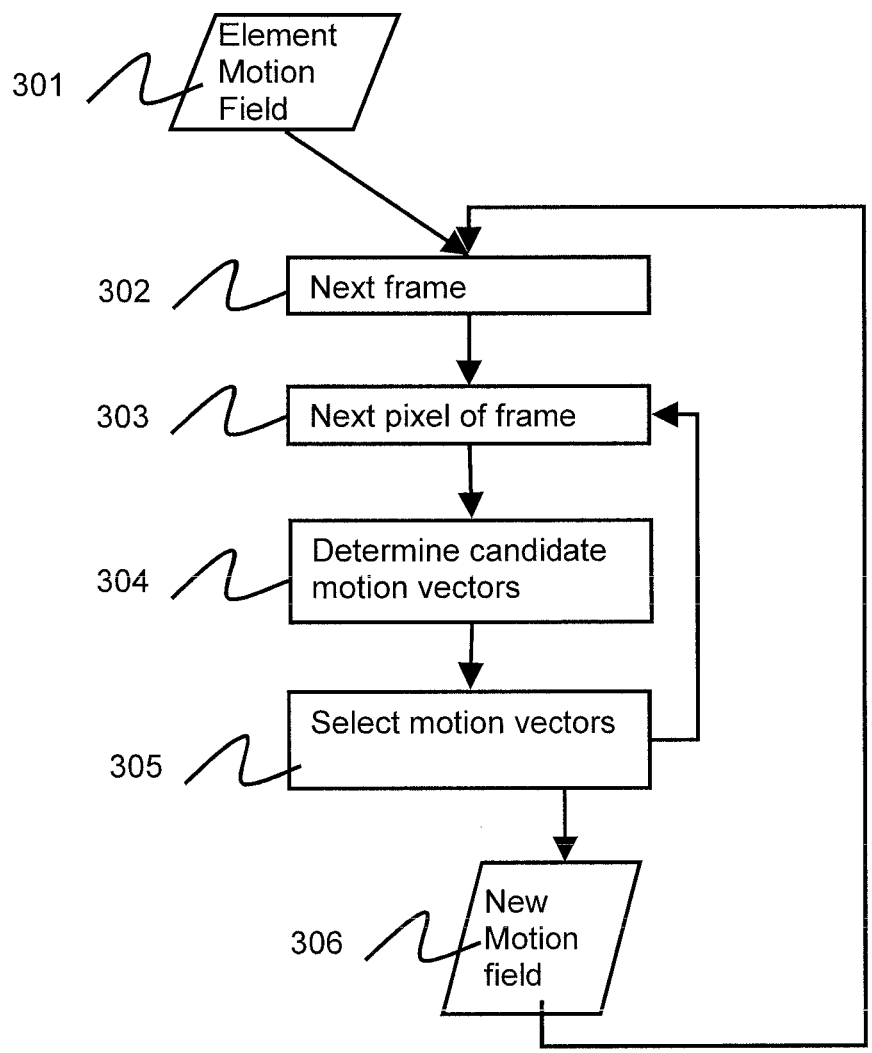
FIG. 3 illustrates the steps of the method according to an embodiment of the invention.

FIG. 3 represents a diagram illustrating the sequential steps of the multi-step method according to an embodiment of the invention corresponding the embodiment of "to the reference" concatenation. An input set 301 of elementary motion fields is provided at the initialisation of the method. A sequential loop is performed on frames of the video sequence. In an advantageous embodiment, motion field for consecutive frames in the video sequence is generated for instance starting from the frame $I_{N-1}$ adjacent to the reference frame $I_N$ and following the order $I_{N-2}, I_{N-3}, \ldots$ to $I_{n+1}$, to $I_n$. Thus motion vectors for intermediary frames that are temporally placed between the reference frame $I_N$ and the current frame $I_n$ are available for the determination of candidate motion vectors for the current frame I. In a step 302, an index representative of the current frame is updated for instance by decrementing the frame number in the video sequence from N to n. Then the steps 303, 304 and 305 are repeated for each pixel of the current frame in order to generate a motion field for the whole current frame. Once the steps are processed for each pixel of current frame, thus generating a multi-step integrated motion field for the current frame with respect to reference frame, the generated motion field is memorized in a step 306. The generated motion field is then a motion field available for the estimation of motion field of the next frame to be processed (previous frame along the temporal axis in this example) or for a second pass of the algorithm. In a step 303, an information (such as spatial coordinates) representative of the current pixel $x_n$ in $I_n$ is updated. In a step 304, a plurality of candidate motion vectors $d_{n,N}(x_n)$ from the current frame $I_n$ to the reference frame $I_N$ is computed. Each candidate motion vector $d_{n,N}(x_n)$ is the result of the sum of a first motion vector $d_{n,n+sk}(x_n)$ from the current frame $I_n$ to an intermediary frame $I_{n+sk}$ and of a second motion vector $d_{n+sk,N}(x_n+d_{n,n+sk}(x_n))$ from the intermediary frame $(I_{n+sk})$ to the reference frame $(I_N)$ through a location $(x_n+d_{n,n+sk}(x_n))$ belonging to an intermediary frame $(I_{n+sk})$. As previously described, the first motion vector $(d_{n,n+sk}(x_n))$ belongs to the input set of elementary motion fields 301 and the second motion vector $d_{n+sk,N}(x_n+d_{n,n+sk}(x_n))$ belongs to a set of previously generated motion fields 306. In a step 305, a motion vector is selected among the candidate motion vectors, computed in step 304. Any method for merging motion field is compatible with the selection step according to the invention. The description discloses a method based on a cost estimation such as Fusion flow.

Once the steps are processed for each pixel of a current frame and for each current frame of the video sequence, a set of dense motion fields for the video sequence with respect to the reference is generated. In a refinement, this complete set of generated motion field 306 is used as an input set of elementary motion fields for a second pass of the method, thus optimizing the generation of a second pass set of dense motion fields. In this refinement, since a complete set of motion field is already available, frames temporally placed before or after the current frame are used for the computing of candidate motion vectors.

Figure 4:
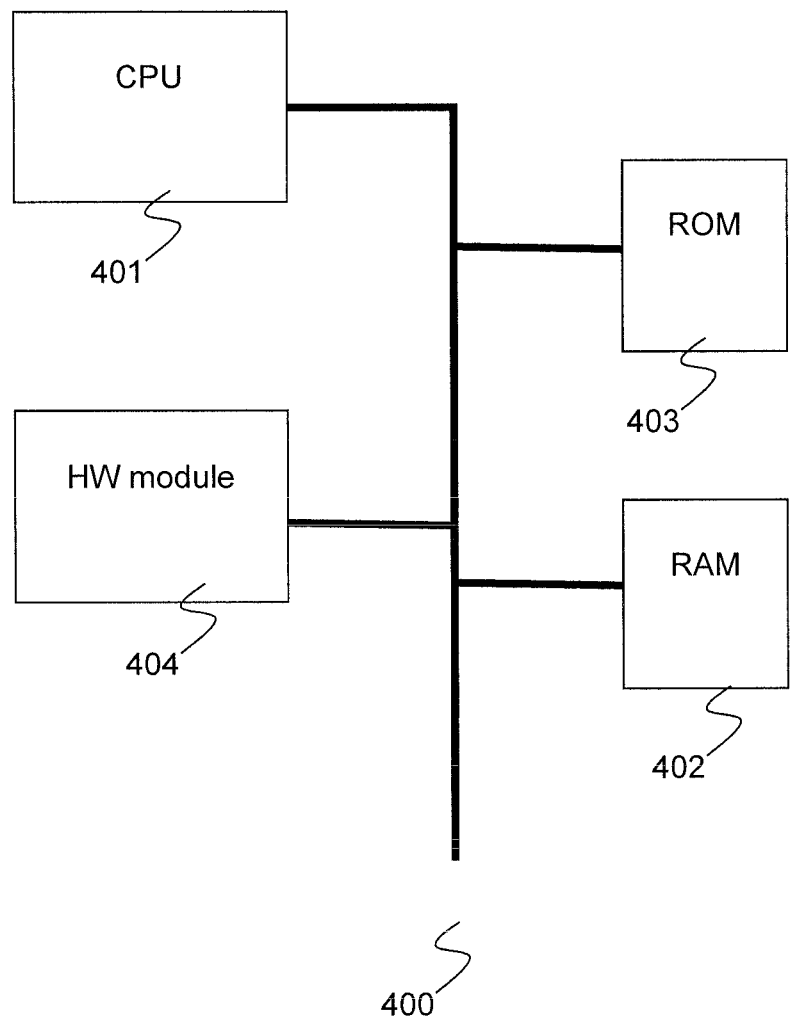
FIG. 4 illustrates a device configured for implementing the method according to an embodiment of the invention.

The skilled person will also appreciate that as the method can be implemented quite easily without the need for special equipment by devices such as PCs. According to different variant, features described for the method are being implemented in software module or in hardware module. FIG. 4 illustrates a device for generating a set of motion fields according to a particular embodiment of the invention. The device is, for instance, a computer at content provider or service provider. The device is, in a variant, any device intended to process video bit-stream. The device 400 comprises physical means intended to implement an embodiment of the invention, for instance a processor 401 (CPU), a data memory 402 (RAM, HDD), a program memory 403 (ROM) and a module 404 for implementation any of the function in hardware. Advantageously the data memory 402 stores the processed bit-stream representative of the video sequence, the input set of elementary motion fields and the generated motion fields of previous iteration of the method. The data memory 402 further stores candidates motion vector before the selection step. Advantageously the processor 401 is configured to determine candidate motion vectors and select the optimal candidate motion vector as the generated motion vectors of the present iteration.

Each feature disclosed in the description and (where appropriate) the claims and drawings may be provided independently or in any appropriate combination. Features described as being implemented in software may also be implemented in hardware, and vice versa. Reference numerals appearing in the claims are by way of illustration only and shall have no limiting effect on the scope of the claims.

The invention claimed is:

1. A method for generating a motion field between a current frame and a reference frame belonging to a video sequence from an input set of elementary motion fields, the method comprising:
   determining a plurality of candidate motion vectors between said current frame and said reference frame, each candidate motion vector being the result of the sum of a first motion vector between said current frame and an intermediary frame belonging to the video sequence and of a second motion vector between said intermediary frame and said reference frame; and
   selecting a motion vector among said plurality of candidate motion vectors;
   wherein said first motion vector belongs to said input set of elementary motion fields, said second motion vector belongs to a set of previously selected motion vectors for other current frames of the video sequence and wherein for at least a candidate motion vector, an interval between a current frame and an intermediary frame is greater than one frame.

2. The method according to claim 1, wherein said determining and selecting are sequentially iterated for successive current frames belonging to the video sequence starting from the frame adjacent to the reference frame.

3. The method according to claim 2, wherein the sequential iteration of said determining and selecting generates a set of motion fields between frames of the video sequence and the reference frame from said input set of elementary motion fields.

4. The method according to claim 1, wherein said determining and selecting are sequentially iterated for successive current frames belonging to the video sequence in the reverse order back to the reference frame.

5. The method according to claim 1, further comprising temporally placing intermediary frames either before or after the current frame.

6. The method according to claim 1, further comprising:
   generating a motion field from a current frame to a reference frame belonging to the video sequence from said input set of elementary motion fields,
   each candidate motion vector being the result of the sum of a first motion vector from said current frame to an intermediary frame belonging to the video sequence and of a second motion vector from said intermediary frame to said reference frame;
   said first motion vector belongs to said input set of elementary motion fields and said second motion vector belongs to a set of previously selected motion vectors for other current frames of the video sequence.

7. The method according to claim 1, further comprising:
   generating a motion field from a reference frame to a current frame belonging to a video sequence from a input set of elementary motion fields and wherein the plurality of candidate motion vectors is determined from said reference frame to said current frame,
   each candidate motion vector being the result of the sum of a second motion vector from said reference frame to an intermediary frame and of a first motion vector from said intermediary frame to said current frame,
   said second motion vector belongs to a set of previously selected motion vectors and said first motion vector belongs to the input set of elementary motion fields.

8. The method according to claim 1, wherein in said determining the plurality candidate motion vectors, the sum comprises a sum of at least two motion vectors through at least one intermediary frame, and wherein a last motion vector belongs to a set of previously selected motion vectors for other current frames of the video sequence and other motion vectors belongs to the input set of elementary motion fields.

9. The method according to claim 1, wherein said input set of elementary motion fields comprises elementary motion fields computed by different estimators each estimator applying a determined method for generating an elementary motion field associated to an ordered pair of frames.

10. A device comprising at least one processor and a memory coupled to the at least one processor, said at least one processor and memory being configured to:
   determine a plurality of candidate motion vectors between said current frame and said reference frame, each candidate motion vector being the result of the sum of a first motion vector between said current frame and an intermediary frame belonging to the video sequence and of a second motion vector between said intermediary frame and said reference frame; and
   select a motion vector among said plurality of candidate motion vectors;
   wherein said first motion vector belongs to said input set of elementary motion fields, said second motion vector belongs to a set of previously selected motion vectors for other current frames of the video sequence, and wherein for at least a candidate motion vector, an interval between a current frame and an intermediary frame is greater than one frame.

11. The device according to claim 10, wherein the processor and memory are further configured to sequentially iterate the determining and selecting for successive current frames belonging to the video sequence starting from the frame adjacent to the reference frame.

12. The device according to claim 11, wherein the sequential iteration of said determining and selecting generates a set of motion fields between frames of the video sequence and the reference frame from said input set of elementary motion fields.

13. The device according to claim 10, wherein said determining and selecting are sequentially iterated for successive current frames belonging to the video sequence in the reverse order back to the reference frame.

14. The device according to claim 10, wherein the processor and memory are further configured to temporally place intermediary frames either before or after the current frame.

15. The device according to claim 10, wherein the processor and memory are further configured to generate a motion field from a current frame to a reference frame belonging to the video sequence from said input set of elementary motion fields;
   each candidate motion vector being the result of the sum of a first motion vector from said current frame to an intermediary frame belonging to the video sequence and of a second motion vector from said intermediary frame to said reference frame; and
   said first motion vector belongs to said input set of elementary motion fields and said second motion vector belongs to a set of previously selected motion vectors for other current frames of the video sequence.

16. The device according to claim 10, wherein the processor and memory are further configured to generate a motion field from a reference frame to a current frame belonging to a video sequence from a input set of elementary motion fields, and the plurality of candidate motion vectors are determined from said reference frame to said current frame;
   each candidate motion vector being the result of the sum of a second motion vector from said reference frame to an intermediary frame and of a first motion vector from said intermediary frame to said current frame; and
   said second motion vector belongs to a set of previously selected motion vectors and said first motion vector belongs to the input set of elementary motion fields.

17. The device according to claim 10, wherein in said determining of the plurality candidate motion vectors, the sum comprises a sum of at least two motion vectors through at least one intermediary frame, and wherein a last motion vector belongs to a set of previously selected motion vectors for other current frames of the video sequence and other motion vectors belongs to the input set of elementary motion fields.

18. The device according to claim 10, wherein said input set of elementary motion fields comprises elementary motion fields computed by different estimators, each estimator applying a determined method for generating an elementary motion field associated to an ordered pair of frames.

19. A method for generating a motion field between a current frame and a reference frame belonging to a video sequence from an input set of elementary motion fields, the method comprising:
   determining a plurality of candidate motion vectors between said current frame and said reference frame, each candidate motion vector being the result of the sum of a first motion vector between said current frame and an intermediary frame belonging to the video sequence and of a second motion vector between said intermediary frame and said reference frame;
   selecting a motion vector among said plurality of candidate motion vectors, wherein said first motion vector belongs to said input set of elementary motion fields, said second motion vector belongs to a set of previously selected motion vectors for other current frames of the video sequence, and for at least one candidate motion vector, an interval between a current time frame and an intermediary time frame is greater than one frame; and
   generating the motion field for the video sequence using the selected motion vector.

20. A device comprising at least one processor and a memory coupled to the at least one processor, said at least one processor and memory being configured to:
   determine a plurality of candidate motion vectors between said current frame and said reference frame, each candidate motion vector being the result of the sum of a first motion vector between said current frame and an intermediary frame belonging to the video sequence and of a second motion vector between said intermediary frame and said reference frame;
   select a motion vector among said plurality of candidate motion vectors, wherein said first motion vector belongs to said input set of elementary motion fields, said second motion vector belongs to a set of previously selected motion vectors for other current frames of the video sequence, wherein for at least a candidate motion vector, an interval between a current frame and an intermediary frame is greater than one frame; and
   generate the motion field for the video sequence using the selected motion vector.

* * * * *